United States Patent [19]

Boyce

[11] Patent Number: 5,208,673
[45] Date of Patent: May 4, 1993

[54] NOISE REDUCTION IN FRAME TRANSMITTED VIDEO SIGNALS

[75] Inventor: Jill M. Boyce, East Windsor, N.J.

[73] Assignee: Matsushita Electric Corporation of America, Secaucus, N.J.

[21] Appl. No.: 788,026

[22] Filed: Nov. 5, 1991

[51] Int. Cl.$^5$ .................. H04N 5/213; H04N 7/18
[52] U.S. Cl. .................. 358/167; 358/105; 358/160
[58] Field of Search ............ 358/167, 105, 138, 135, 358/133, 177, 138, 36, 37, 21

[56] References Cited

U.S. PATENT DOCUMENTS

| | | | |
|---|---|---|---|
| 4,679,086 | 7/1987 | May | 358/167 |
| 4,777,530 | 10/1988 | Kondo | 358/105 |
| 4,924,306 | 5/1990 | Vander Mere et al. | 358/105 |
| 4,924,310 | 5/1990 | Von Brandt | 358/105 |

OTHER PUBLICATIONS

"MPEG Video Simulation Model 3 (SM3)", *Simulation Model Editorial Group*, Jul. 25, 1990.
"Advanced Digital Television Description", The Advanced Television Consortium, Feb. 27, 1991.
*Two Dimensional Signal and Image Processing* by Jae S. Linm, Prentice Hall, pp. 568-575.
"Noise Reduction in Image Sequences Using Motion-Compensated Temporal Filtering," Eric Dubois et al., *IEEE Trans. on Communications,* vol. Com. 32, No. 7, Jul. 1984.

Primary Examiner—James J. Groody
Assistant Examiner—Michael H. Lee
Attorney, Agent, or Firm—Ratner & Prestia

[57] ABSTRACT

A method for reducing noise in a reference frame of video information by determining the mean absolute difference, $MAD_o$, between each block in the reference frame and identically located blocks in adjacent frames. If $MAD_o$ is $<A$, the block in an adjacent frame is held for averaging with the block in the reference frame, but if $MAD_o$ for the block is $>A$, a search is made for a block in the adjacent frame that matches the block in the reference frame. This is labelled $MAD_{min}$. If $MAD_o$ for the block in the adjacent frame is $<BMAD_{min}$, the matching block is not used in the average. If $MAD_o$ is not $<BMAD_{min}$, the matching block can be used in the average, but preferably this is not done if $MAD_{min}$ exceeds a value C. The values of A, B and C are determined by experience for the block size used.

10 Claims, 3 Drawing Sheets

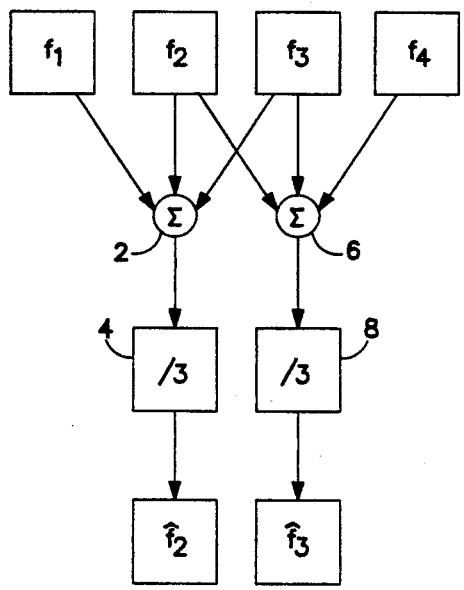
FIG. 1
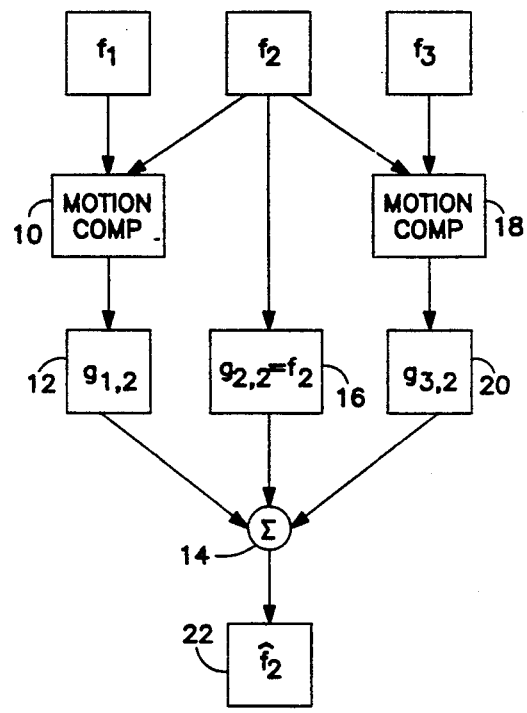
FIG. 2
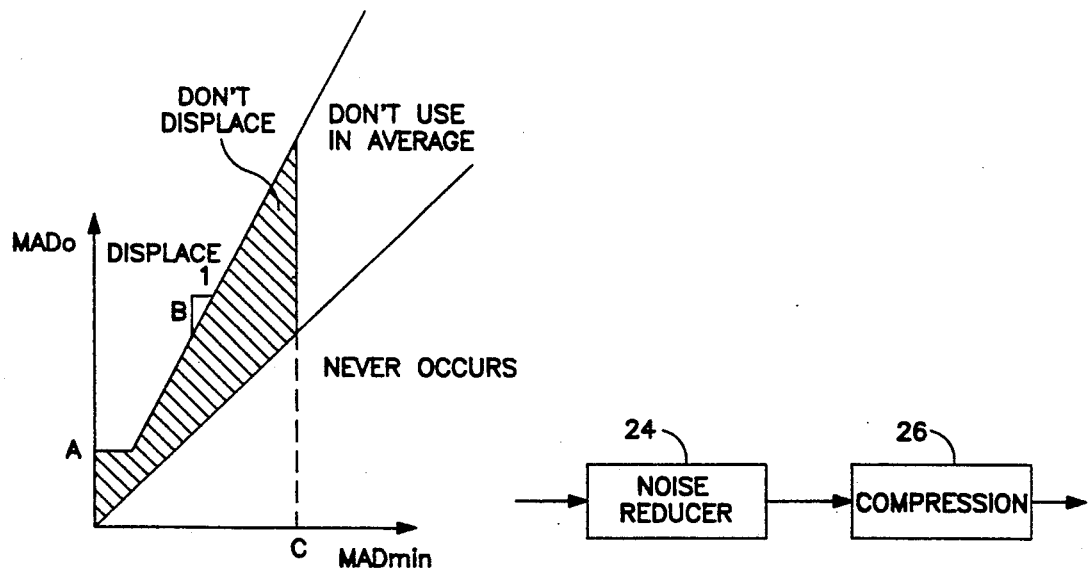
FIG. 4
FIG. 3

NOISE REDUCTION IN FRAME TRANSMITTED VIDEO SIGNALS

BACKGROUND OF THE INVENTION

In systems designed for the digital transmission of images with as few bits as possible, noise from cameras and other sources not only degrades the image but also increases the number of bits required. Such systems generally operate by transmitting only the differences between successive frames, and since noise is usually random in nature, it adds to the difference.

One approach to noise reduction is the use of a frame averaging temporal pre-filter. In its simplest form, N adjacent frames of an image sequence are averaged together to form a frame in which the signal to noise ratio S/N is increased. This is due to the fact that noise is randomly distributed so that its average will be less than peak values whereas the average of a repetitious signal has the same values as the signal. Let $f_j$ be the input frames and $\hat{f}_i$ be the frame averaged noise reduced frame, and $(n_1, n_2)$ be the position within the block. Then, $$\hat{f}_i(n_1, n_2) = \frac{1}{N} \sum_{j=i-k}^{i+(N-k)} f_j(n_1, n_2) \qquad 1)$$

Usually $k=(N-1)/2$ but all that is necessary is that $k \epsilon [0, N]$. If the input image sequence is static, i.e., has no motion, then this method results in the best possible noise reduction. Assuming zero-mean, stationary, white Gaussian noise, with N frames averaged together, a reduction in noise variance by a factor of N is achieved, see "Two Dimensional Signal and Image Processing" by J. Lim, (Prentice Hall, 1990, pp. 568-574.) specifically pages 568-9, which is incorporated by reference herein. If, however, the image is moving, applying simple frame averaging blurs the moving objects so as to reduce the image resolution.

The use of motion compensation with frame averaging can solve the problem of blurring. When motion compensation is used, $N-1$ motion compensated estimates of the reference frame under consideration are formed when N adjacent frames are to be used in the average. Then, these estimates, rather than the input frames, as in simple frame averaging, are averaged with the reference frame to form the noise reduced frame. If we let $f_j$ be the input frames, and $\hat{f}_i$ be the motion compensated frame averaged noise reduced frames and $g_{j,i}$ be the motion compensated prediction of $\hat{f}_i$ using $f_j$, then, $$\hat{f}_i(n_1, n_2) = \frac{1}{N} \sum_{j=i-k}^{i+(N-k)} g_{j,i}(n_1, n_2) \qquad 2)$$

The motion compensated estimate can be formed by using block matching. The frames are divided into identical blocks. For each block in frame i, the closest matching block in each frame j is found. A common criterion to use in judging the closest match between two blocks is the mean absolute difference, MAD. Each block in the frame i is included in the average.

Moving objects in successive frames are well matched by this process so that the image resolution is retained. The best matches are achieved when small blocks are used. When, however, block matching is applied to a block that has little signal component and much noise, the matching block found matches the noise rather than the signal so that when frame averaging is performed, little noise reduction is achieved. Using large blocks makes it less likely that noise will be matched, but there may be poorer performance in signal matching. Thus, it is difficult to select an optimal block size.

BRIEF DESCRIPTION OF THE INVENTION

In accordance with this invention, noise reduction is achieved by adaptively switching on a block by block basis between simple frame averaging and motion compensated frame averaging. When objects within a block are not moving, frame averaging is used, and when the objects are moving, motion compensated frame averaging is used. In motion compensated frame averaging, the blocks of a reference frame are averaged with their matching blocks in other frames. One way of determining whether or not there is motion is to derive the mean absolute difference, $MAD_o$, between each block in the reference frame for which noise is to be reduced and identically located blocks in other frames. If the objects in the block under consideration are not moving, $MAD_o$ has a very low value so that there is no need to use motion compensation. If, however, $MAD_o$ for a block in another frame is greater than some given value A, motion compensation should be considered.

In motion compensation, a displacement block is found in another frame having the best match with the block in the reference frame. This block may be the one having a minimum absolute difference, $MAD_{min}$, with the block in the reference frame. It has been observed that if a block contains only noise, $MAD_o$ and $MAD_{min}$ will be close in value and both will be relatively small, but if a block contains a moving object, $MAD_o$ will be very high and $MAD_{min}$ will be significantly lower but higher than in the noise only case. Thus, if the ratio of $MAD_o$ to $MAD_{min}$ is greater than some predetermined value B, the matching block in the other frame may be averaged with the block in the reference frame.

This procedure permits the use of smaller blocks so that there is less blurring because if the block in the reference frame is mostly noise and is matched with a block having noise, the matching block is not used.

In accordance with an aspect of this invention, a block having a value of $MAD_{min}$ that is greater than some empirically determined value, C, is considered to be caused by a poor motion estimate such as due to a change in scene so that it is not included in the average.

Where $(n_1, n_2)$ is the position within the motion block of size $(N_1, N_2)$ and $d_1, d_2$ are the displacements, and the $f_i$'s are the input frames, $$MAD_{i,j}(d_1,d_2) = \frac{1}{N_1 N_2} \sum_{n_1} \sum_{n_2} |f_i(n_1,n_2) - f_j(n_1 - d_1, n_2 - d_2)| \qquad 3)$$

$$MAD_{min\ i,j} = \qquad \qquad 4)$$
$$\min_{d_1,d_2} \frac{1}{N_1 N_2} \sum_{n_1} \sum_{n_2} |f_i(n_1,n_2) - f_j(n_1 - d_1, n_2 - d_2)|$$

$$MAD_{o\ i,j} = \frac{1}{N_1 N_2} \sum_{n_1} \sum_{n_2} |f_i(n_1,n_2) - f_j(n_1,n_2)| \qquad 5)$$

In some cases, the criterion used for block matching may be the minimum value of the Mean Square Error (MSE), wherein, $$MSE_{i,j}(d_1, d_2) = \frac{1}{N_1 N_2} \sum_{n_1} \sum_{n_2} [f_i(n_1, n_2) - f_j(n_1, n_2)]^2 \quad 6)$$

In accordance with a further aspect of the invention, the blocks from different frames could be averaged directly or they could be weighted e.g. blocks from frames that are farther from the reference frame could be given less weight. This can be expressed by the following equations:

For simple (non-displaced) weighted frame averaging $$\hat{f}_i(n_1, n_2) = \frac{1}{N} \sum_{j=i-k}^{i+(N-k)} a_j f_j(n_1, n_2) \quad 7)$$

For motion compensated weighted frame averaging $$\hat{f}_i(n_1, n_2) = \frac{1}{N} \sum_{j=i-k}^{i+(N-k)} a_j g_{j,i}(n_1, n_2) \quad 8)$$

where $$\sum_{j=i-k}^{i+(N-k)} a_j = N$$

For the case of direct averaging, the weights $a_j = 1$.

BRIEF DESCRIPTION OF THE DRAWINGS

FIG. 1 is a block diagram illustrating frame averaging of the prior art;

FIG. 2 is a block diagram illustrating motion compensated frame averaging of the prior art;

FIG. 3 is a block diagram illustrating the use of noise reduction means in a system where signal compression is used;

FIG. 4 is a graph illustrating operative factors of the invention; and

DETAILED DESCRIPTION OF THE INVENTION

Figure 5:
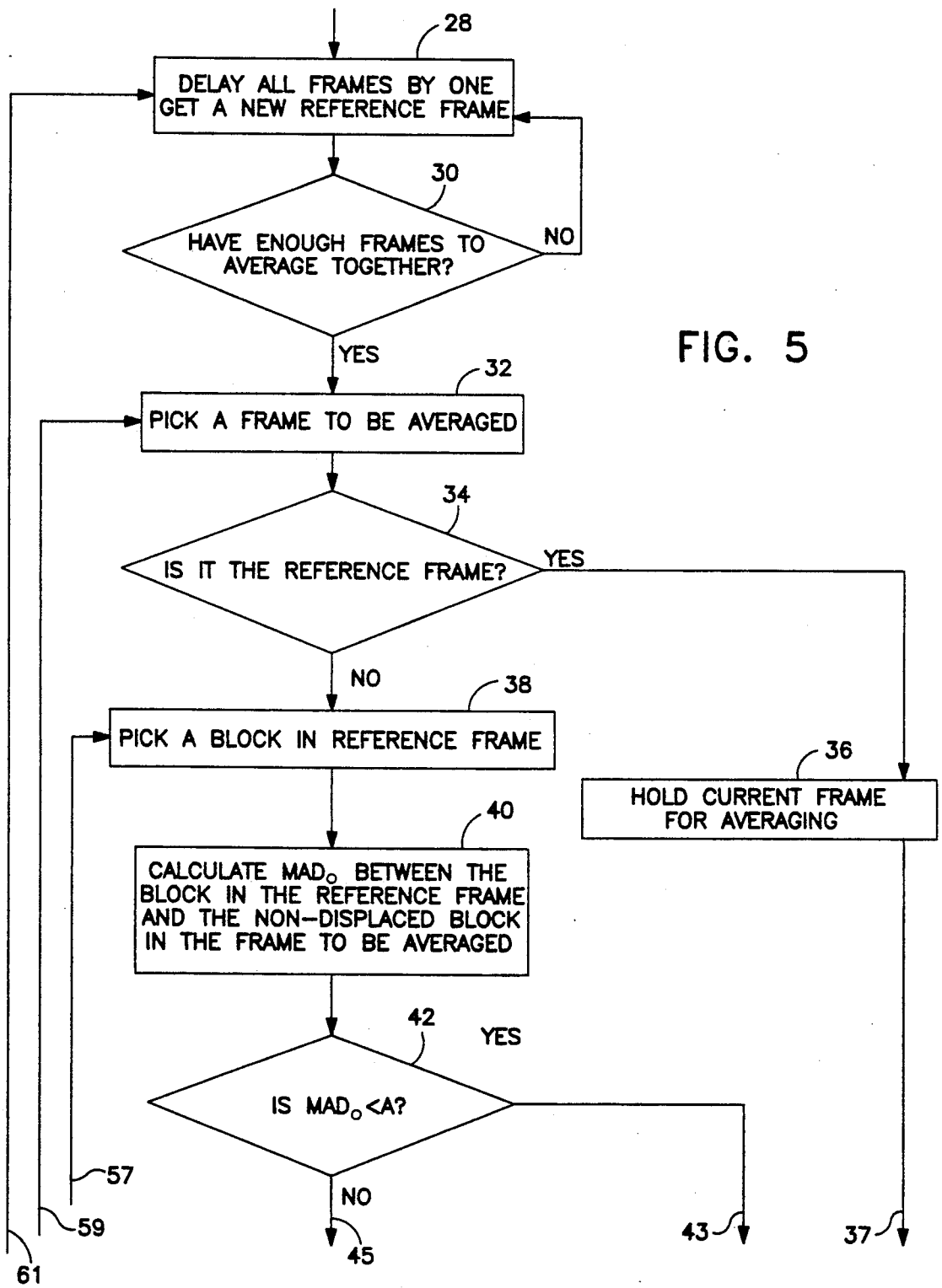
FIGS. 5 and 6 are respective portions of a flow chart illustrating the method used by the invention in reducing noise.

FIG. 1 illustrates the operation of the prior art method of reducing noise by averaging three consecutive frames so that $N=3$ in equation 1. Frames $f_1$, $f_2$ and $f_3$ are applied to a summer 2, and its output is divided by three divider 4 so as to produce a noise reduced frame $\hat{f}_2$ for a reference frame $f_2$. The next sequence of three frames, $f_2$, $f_3$ and $f_4$ produces a noise reduced frame $\hat{f}_3$ for a reference frame $f_3$ in a similar manner by summing the frames in a summer 6 and dividing the output of the summer by 3 in a divider 8. This requires the storage in memory of two frames and a summation of their pixels and the pixels of a current frame as they arrive. If there is no motion, this is the most effective method of noise reduction, but any moving object will be blurred.

In the prior art illustrated in FIG. 2, blurring is reduced by using motion compensation. The frame $f_1$, the reference frame, $f_2$, and the frame $f_3$ are divided into identical blocks of pixels e.g. having eight pixels on a side so that each block contains sixty-four pixels. As a block of the frame $f_2$ is addressed, a motion compensation means 10 searches in an area of $f_1$ surrounding that position of that block for a matching block. This may be done by finding the mean absolute difference between each pixel in a block of $f_1$ that is within the search area and the corresponding pixels in the addressed block of $f_2$ and determining the mean value, MAD, of these differences. The block in the search area of $f_1$ having the least difference, $MAD_{min}$, is found by a selection means 12 and supplied to a summer 14. The blocks in the reference frame $f_2$ for which a match was sought are selected by a means 16 and supplied to the summer 14. A motion compensation means 18 and a selection means 20 find a block in $f_3$ having the least $MAD_{min}$ with respect to the selected block in $f_2$ and supply it to the summer 14. Means 22 divides the output of the summer 14 by three so as to produce the block that is to be used in the noise reduced frame $\hat{f}_2$, for the frame $f_2$. This procedure is used for all the blocks in $f_2$.

FIG. 3 illustrates that the noise reducing means 24, whether it be constructed in accordance with the prior art or in accordance with this invention, be inserted ahead of means 26 for compressing the number of bits required for transmission.

FIG. 4 is a graphical representation of the relationships between $MAD_o$ and $MAD_{min}$ as well as values of $MAD_o$ and $MAD_{min}$ that are considered in determining whether an identically located block in another frame, a displaced or matching block from that frame or no block from that frame should be used in deriving an average value to be used for a block in the reference frame. $MAD_o$ is the mean of the absolute differences between pixels in the block in a reference frame for which noise is to be reduced and the pixels in a block having the same position in another frame, and $MAD_{min}$ is the mean of the absolute differences between the pixels in a block of a reference frame and the pixels of matching block in another frame. The matching block is the one having the minimum value of mean absolute difference, MAD, which is $MAD_{min}$.

From FIG. 4 it can be seen that $MAD_{min}$ is never less than $MAD_o$. The reason for this is that if the block having the same position as the block for which a match is sought has the minimum value of MAD, it would be the matching block. Note that if $MAD_o$ is less than an empirically determined value of A or if the ratio of $MAD_o$ to $MAD_{min}$ is not greater than an empirically determined value of B, a matching or displaced block is not used in the average. Finally, in a preferred method, a matching block is not used if $MAD_{min}$ is greater than some empirically determined value C. The values of A, B and C may vary with the number of pixels in a block, but for a block that is four pixels wide and two pixels high, values of $A=80$, $B=2$ have been found to yield good results.

The reasons for using values like A, B, and C are as follows. If $MAD_o$ is not greater than A, it is assumed that the objects in the block are not moving. Therefore, the non displaced block should be used rather than the displaced block. If the ratio of $MAD_o/MAD_{min}$ is less than B, it is considered that the differences between the blocks are due to noise so that the non displaced block is used. If $MAD_{min}$ for a block exceeds C, it is probably because of a scene change or for a block on the edge of a frame when a camera is panned and not due to motion so that it should not be used in the average.

Figure 6:
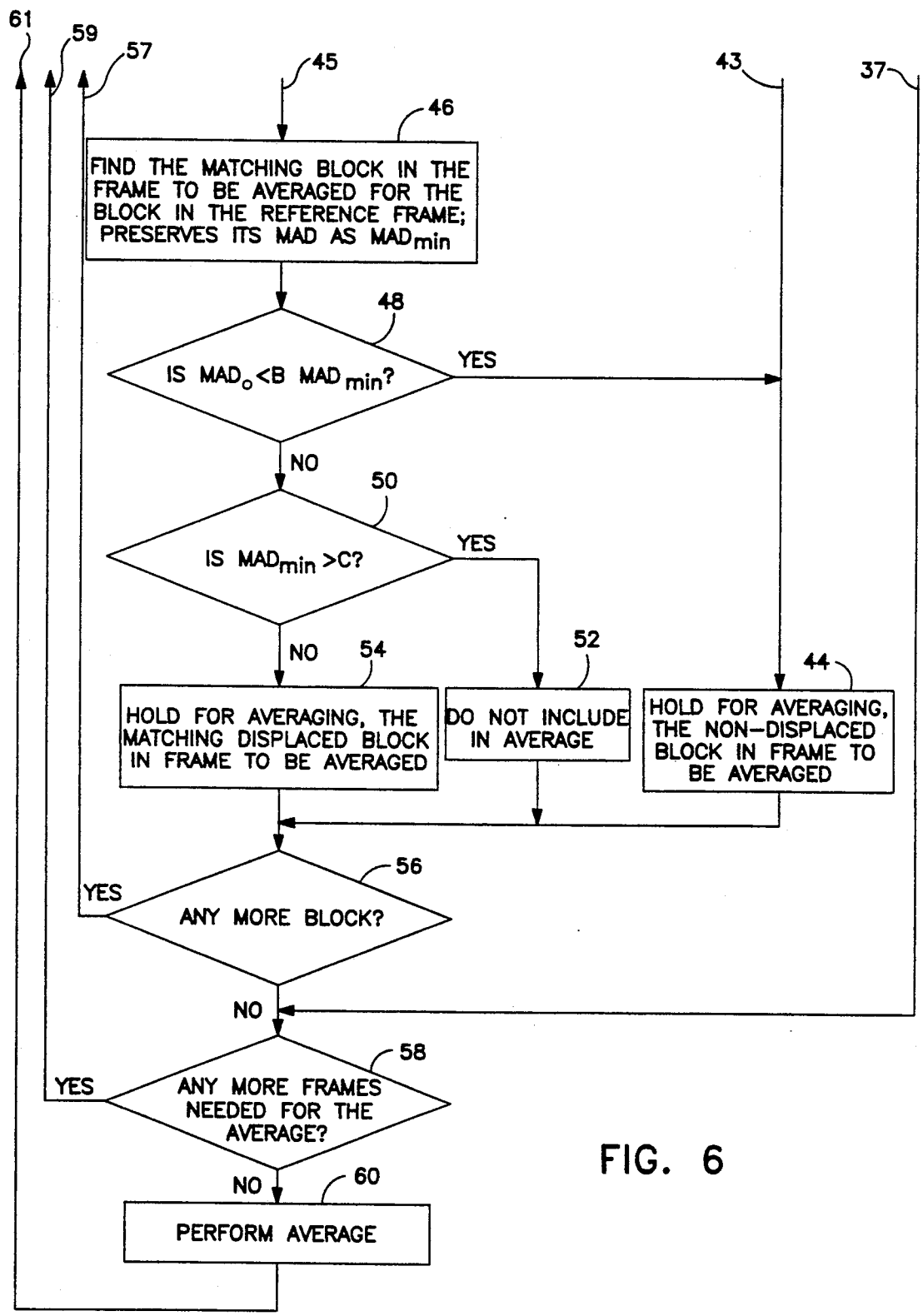

The flow charts of FIGS. 5 and 6 illustrate a method for carrying out the invention.

In the flow chart of FIG. 5, a block 28 indicates that received frames of data are delayed by one frame, and a block 30 determines whether or not the number of frames to be considered in the average have been received. Thus, if N=3, three frames would have to be available before the block 30 gave a YES answer.

A block 32 then picks one of the frames that are available, and if it chances to be the reference frame, block 34, i.e., the frame for which noise is to be reduced, then all blocks for that frame are held for averaging, block 36, as no calculations are required.

If the frame picked is other than the reference frame, a block 38 selects a block in the reference frame and $MAD_o$ is calculated for a non-displaced block in the selected frame, and if $MAD_o$ is <A, the non-displaced block is held for averaging, block 44 of FIG. 6.

If $MAD_o$ is not <A, block 42, the procedure goes by way of a line 45 to a block 46 of FIG. 6 where a matching block is found in the frame to be averaged, block 46 of FIG. 6, for the block in the reference frame. Since the value of MAD for the matching block had to be determined in finding that it is a match, its MAD is retained as $MAD_{min}$. A block 48 then determines if $MAD_o$ for the selected block in the reference frame is <$BMAD_{min}$ for the matching block and if it is, the non-displaced block is held for averaging, block 44.

On the other hand, if $MAD_o$ for a block in the reference frame is not <$BMAD_{min}$, it is a candidate for being used in the averaging process, but before this is done in a preferred form of the invention, a block 50 determines whether $MAD_{min}$ is >C. If so, the block is probably the result of a change in scene or on the edge of a frame when a camera is being panned so that it should not be used in the average as indicated by a block 52. But, if $MAD_{min}$ for the matching block is not >C, block 50, a block 54 holds the matching displaced block for averaging. If this aspect of the invention is not used, the blocks 50 and 52 can be omitted so that the procedure goes from the NO output of the block 48 to the input of the block 54.

A block 56 then determines whether there are any more blocks in the frame to be processed. If so, the process loops via line 57 back to the block 38 of FIG. 5, and another block in the reference frame is processed as just described. But if all blocks in a frame to be averaged have been processed, a block 58 determines whether there are any more frames to be processed. If, for example, N=3 and only two frames have been processed, the procedure loops back via a line 59 to the block 32 for the selection of another frame. If no more frames are needed for the average, the averages of the blocks held for averaging are obtained, block 60, and the procedure loops back to the block 28 via a line 61 so that the entire procedure is repeated to find the averages for blocks in the next reference frame.

The block 60 can operate as a temporal filter with equal weights as in equations 1 and 2 or with unequal weights as in equations 7 and 8.

One of the advantages of the procedure set forth in the flow chart of FIGS. 5 and 6 is that the matching process of the block 46 does not have to be carried out for blocks in the reference frame for which the block 48 determines that $MAD_o$<$BMAD_{min}$.

What is claimed is:

1. A method for reducing the noise in video signals of sequential frames comprising:

generating a difference signal indicating differences between pixel signals of blocks in a reference frame and corresponding blocks in another frame;

comparing pixel signals of the block in the reference frame to pixel signals of a matching block the other frame to generate a measure of image noise distortion;

combining the difference signal with the measure of noise distortion to generate a reliable motion signal indicating that the block in the reference frame exhibits motion relative to the corresponding block in the other frame;

respectively averaging the pixel signals of blocks of a reference frame with the pixel signals of corresponding blocks in another frame only when the reliable motion signal has a value indicating that there is relatively little motion between the block in the reference frame and the corresponding block in the other frame, 2. A method as set forth in claim 1 wherein the difference signal is generated based on the mean absolute difference between the corresponding blocks of the respective reference and other frames ($MAD_o$) and the measure of image noise is generated from the minimum mean absolute difference value for the block in the reference frame and each block in the other frame (MAD).

3. A method as set forth in claim 1 wherein motion between corresponding blocks of two frames is considered to exist when $MAD_o$ is greater than a first predetermined threshold value A and when the ratio of $MAD_o$ to $MAD_{min}$ is greater than a second predetermined threshold value B, indicating that image differences represented by $MAD_o$ are substantially greater than noise differences indicated by $MAD_{min}$.

4. A method as set forth in claim 2, further including the step of:

locating, as the matching block, one block from a selected plurality of blocks in the other frame which exhibits a minimum absolute difference value ($MAD_{min}$) with the block in the reference frame; and averaging the block from the reference frame with the matching block when the reliable motion signal indicates that the block in the reference frame exhibits motion and when $MAD_{min}$ is not greater than a third predetermined threshold value, C.

5. A method as set forth in claim 3 wherein each of said blocks has dimensions of four pixels by two pixels and A=80 and B=2.

6. A method as set forth in claim 1 wherein in said averaging step both the block from the reference frame and the corresponding block from the other frame are given equal weight.

7. A method as set forth in claim 1 wherein, in the averaging step, corresponding blocks from a plurality of other frames are averaged with the block from the reference frame and said averaging step is accomplished by weighted averaging so that blocks from ones of the other frames that are displaced farther in time from the reference frame are given less weight.

8. A method for reducing noise in frames of video information comprising:

making available a number of frames including a reference frame in which noise is to be reduced;

deriving a $MAD_o$ value for each of a plurality of blocks of pixels in said reference frame with respect to corresponding blocks in at least one other frame, said $MAD_o$ value representing a mean absolute difference between the pixels in the block in the reference frame and the respective pixels in the block in the other frame;

for each of the blocks in a reference frame having a $MAD_o$ greater than a predetermined threshold value A, deriving a $MAD_{min}$ value, representing a minimum mean absolute difference value between the block in the reference frame and a plurality of blocks selected from the other frame wherein the $MAD_{min}$ value defines a matching block in the other frame;

averaging the blocks of the reference frame with corresponding blocks of the other frame when, the value of their $MAD_o$ is less than said predetermined threshold value A, or the ratio of the $MAD_o$ and $MAD_{min}$ values for the block from the reference frame is less than a predetermined threshold value B; and averaging the blocks of the reference frame with the respective matching blocks in at least one other frame when, the value of $MAD_o$ for the block from the reference frame is greater than the predetermined threshold value A and the ratio of $MAD_o$ to $MAD_{min}$ is for the block in the reference frame is greater than the predetermined threshold value B.

9. A method as set forth in claim 8 further comprising:

excluding the matching block for the block from the reference frame from the averaging if its value of $MAD_{min}$ is greater than a predetermined threshold value C.

10. A method for reducing noise in video signals transmitted in sequential frames comprising:

making available a number of frames including a reference frame in which noise is to be reduced;

sequentially addressing blocks in said reference frame;

holding blocks in said reference frame for averaging;

determining a value of $MAD_o$ for each of the blocks in said reference frame, said value of $MAD_o$ representing the mean absolute difference between pixels in the block in the reference frame and pixels in a corresponding block in the other frame;

holding the corresponding blocks in the other frame for averaging with the blocks in the reference frame for which the value of the $MAD_o$ value is greater than a predetermined threshold value A;

finding matching blocks in said at least one other frame for blocks in said reference frame for each block in the reference frame for which the $MAD_o$ value is greater than the predetermined threshold value A;

providing the mean absolute difference values between the blocks in the reference frame and the respective matching blocks in the other frame as respective $MAD_{min}$ values for said matching blocks;

holding said matching blocks for averaging with the respective blocks from the reference frame if the ratio of their respective $MAD_{min}$ values to their respective $MAD_o$ values is greater than the predetermined threshold value, B; and averaging the blocks held for averaging.

* * * * *